(12) United States Patent
Adkins et al.

(10) Patent No.: US 6,328,279 B1
(45) Date of Patent: Dec. 11, 2001

(54) MINIATURE ELECTRICALLY OPERATED DIAPHRAGM VALVE

(75) Inventors: Douglas R. Adkins; Barry L. Spletzer; Chungnin C. Wong, all of Albuquerque; Gregory C. Frye-Mason, Cedar Crest; Gary J. Fischer, Albuquerque, all of NM (US); Peter J. Hesketh, Atlanta, GA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/495,408

(22) Filed: Jan. 31, 2000

(51) Int. Cl.[7] ................................................... F16K 31/06
(52) U.S. Cl. ................................. 251/129.07; 251/129.17
(58) Field of Search ........................ 251/129.07, 129.15, 251/129.17, 129.09

(56) References Cited

U.S. PATENT DOCUMENTS 4,304,391 * 12/1981 Yamaguchi ................... 251/129.17 X
5,653,422 * 8/1997 Pieloth et al. ................. 251/129.17 X

OTHER PUBLICATIONS

Hal Jerman, Electrically–activated, normally–closed diaphragm valves, Journal of Micromech Microeng., vol. 4, pgs. 210–216 (1994).
Wong, et al, Development of a Latching Valve for Micro–ChemLab™, ASME 1999 International Mechanical Engineering Congress & Exxposition Session on MicroFluids, Nov. 14, 1999.
Lee Company Technical Center, Electro–Fluidic Systems Technical Handbook, 6th Edition, Component Catalog 1994.
Redwood Microsystems, NC–1500 Fluistor™ Microvalve, Data Sheet.
NAiS, TQ–Relays, Data Sheet.

* cited by examiner

Primary Examiner—Kevin Lee
(74) Attorney, Agent, or Firm—V. Gerald Grafe

(57) ABSTRACT

The present invention provides a miniature electrically operated valve that can stand off significant pressures, that can be inexpensively produced, and that can be made to operate without continuous electrical power. A valve according to the present invention comprises a housing and a beam mounted with the housing. A diaphragm mounted with the housing forms a sealed fluid volume. An electromagnetic energy source, such as an electromagnetic coil, mounts with the housing and when energized urges the beam in one direction. The beam can be urged in the opposing direction by passive means or by reversing the polarity of the electromagnetic energy source or by a second electromagnetic energy source. Two fluid ports mount with the housing. A first fluid port mounts so that, as the beam is urged in one direction or the opposite, the beam urges the diaphragm to move between engaging and substantially sealing the fluid port and disengaging and not substantially sealing the fluid port. A seat can be mounted with the diaphragm to aid in sealing the fluid port. Latching mechanisms such as permanent magnets can be mounted so that the valve remains in the open or closed positions without continuous electrical power input. Fluid can flow through the housing between the two fluid ports when the diaphragm does not seal the first fluid port, but can be prevented from flowing by urging the beam so that the diaphragm seals the first fluid port. Various embodiments accommodate various latching mechanisms, electromagnetic energy sources, number of fluid ports, and diaphragm design considerations.

12 Claims, 3 Drawing Sheets

MINIATURE ELECTRICALLY OPERATED DIAPHRAGM VALVE

This invention was made with Government support under Contract DE-AC0494AL85000awarded by the U.S. Department of Energy. The Government has certain rights in the invention.

RELATED APPLICATIONS

This application is related to an application titled "Miniature High Pressure Electrically Operated Valve," Ser. No. 09/306,675, filed previously.

BACKGROUND OF THE INVENTION

This invention relates to the field of electrically operated valves, specifically miniature valves that can be inexpensively produced.

Electrically-operated valves are widely known, and are used in a wide variety of applications. The required mechanical actuation generally requires significant force, and the consequent valves are generally large and consume significant electrical power for actuation.

Miniature electrically-operated valves are available. Conventional miniature electrically-operated valves are generally very expensive, and often require continuous electrical current to maintain the valve in the open or closed positions. Further, they often have limited ability to stand off significant fluid pressures. Accordingly, conventional miniature electrically-operated valves are not suitable for applications where cost is important, and for applications where continuous electrical power for valve operation is undesirable.

Accordingly, there is a need for a miniature electrically operated valve that can stand off significant pressures, that can be inexpensively produced, and that can be made to operate without continuous electrical power.

SUMMARY OF THE INVENTION

The present invention provides a miniature electrically operated valve that can stand off significant pressures, that can be inexpensively produced, and that can be made to operate without continuous electrical power. A valve according to the present invention comprises a housing and a beam mounted with the housing. A diaphragm mounted with the housing forms a sealed fluid volume. An electromagnetic energy source, such as an electromagnetic coil, mounts with the housing and when energized urges the beam in one direction. The beam can be urged in the opposing direction by reversing the polarity of the electromagnetic energy source or by a second electromagnetic energy source. Two fluid ports mount with the housing. A first fluid port mounts so that, as the beam is urged in one direction or the opposite, the beam urges the diaphragm to move between engaging and substantially sealing the fluid port and disengaging and not substantially sealing the fluid port. A seat can be mounted with the diaphragm to aid in sealing the fluid port. Latching mechanisms such as permanent magnets can be mounted with the valve so that the valve remains in the open or closed positions without continuous electrical power input. Fluid thus can flow through the housing between the two fluid ports when the diaphragm does not seal the first fluid port, but can be prevented from flowing by urging the beam so that the diaphragm seals the first fluid port. Various embodiments accommodate various latching mechanisms, electromagnetic energy sources, number of fluid ports, and diaphragm design considerations.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 3:
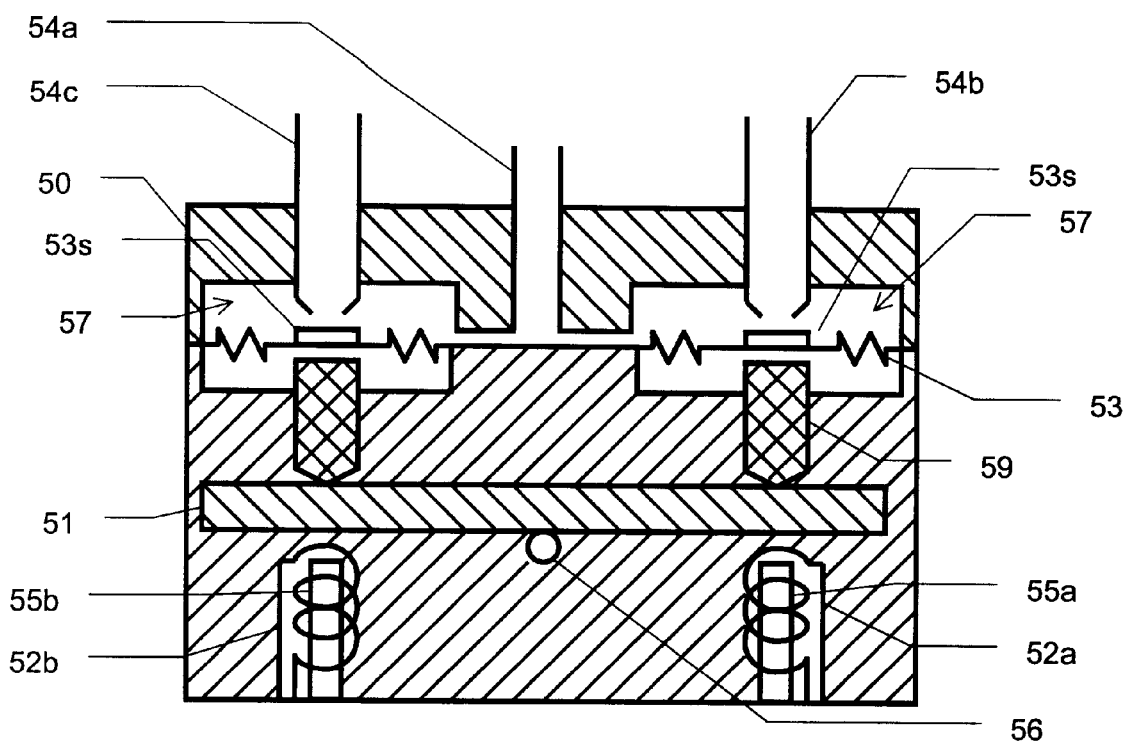
FIG. 3 is a schematic view of a miniature electromagnetic valve.

The present invention provides a miniature electrically operated valve that can stand off significant pressures, that can be inexpensively produced, and that can be made to operate without continuous electrical power. A valve according to the present invention comprises a housing and a beam mounted with the housing. A diaphragm mounted with the housing forms a sealed fluid volume. An electromagnetic energy source, such as an electromagnetic coil, mounts with the housing and when energized urges the beam in one direction. The beam can be urged in the opposing direction by reversing the polarity of the electromagnetic energy source or by a second electromagnetic energy source. Two fluid ports mount with the housing. A first fluid port mounts so that, as the beam is urged in one direction or the opposite, the beam urges the diaphragm to move between engaging and substantially sealing the fluid port and disengaging and not substantially sealing the fluid port. A seat can be mounted with the diaphragm to aid in sealing the fluid port. Latching mechanisms such as permanent magnets can be mounted with the valve so that the valve remains in the open or closed positions without continuous electrical power input. As shown in FIG. 3, the beam itself can be a permanent magnet that performs the latching function. Fluid thus can flow through the housing between the two fluid ports when the diaphragm does not seal the first fluid port, but can be prevented from flowing by urging the beam so that the diaphragm seals the first fluid port. Various embodiments accommodate various latching mechanisms, electromagnetic energy sources, numbers of fluid ports, and diaphragm design considerations.

VALVE EMBODIMENT

Figure 1:
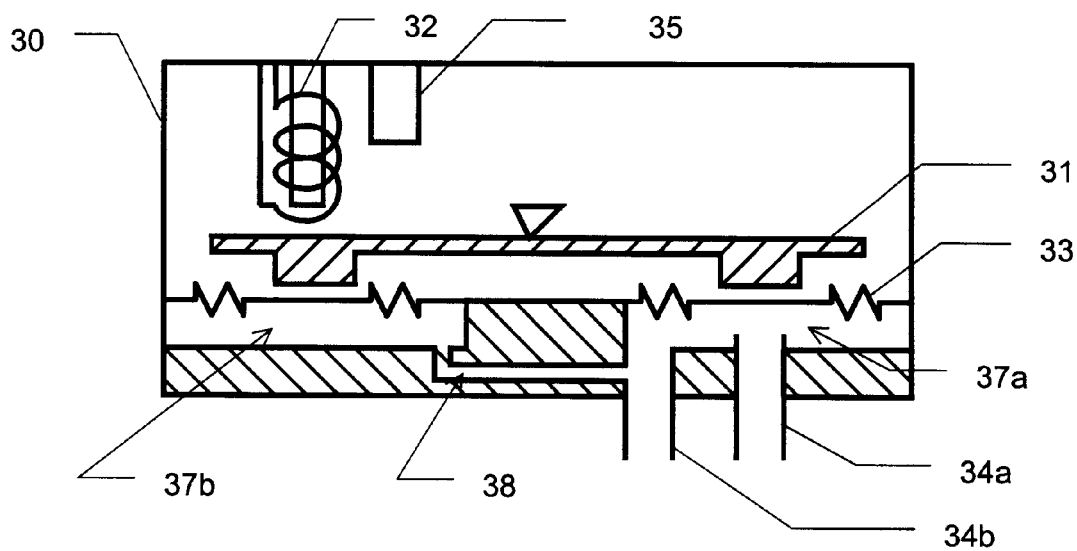
FIG. 1 is a schematic view of a miniature electromagnetic valve.

FIG. 1 is a schematic view of a valve according to the present invention. Diaphragm 33 mounts with housing 30, enclosing volumes 37a, 37b. Beam 31 mounts with housing 30, as does electromagnetic force generator 32. First 34a and second 34b fluid ports mount with housing 30 and are in fluid communication with volume 37a. Beam 31 is mounted with housing 30 so that beam 31 is moveable between first and second positions: when in the first position beam 31 allows diaphragm 33 away from first fluid port 34a, and when in the second position beam 31 urges diaphragm 33 toward and substantially seals first fluid port 34a.

Electromagnetic force generator 32 mounts with housing 30 and urges beam 31 to the second position when electrical energy is applied to electromagnetic force generator 32. For example, beam 31 can be a magnetic material that can be urged to move by electromagnetic force generator 32. Alternate energization of electromagnetic force generator 32 can urge beam 31 to the first position, or the mounting of beam 31 with housing 30 can supply passive urging of beam 31 to the first position. For example, fluid pressure in first fluid port 34a or a permanent magnet can passively urge beam 31 to the first position.

Latch 35, although not required, can mount with housing 30 and provide benefits for some applications. Latch 35 can exert force on beam 31 sufficient to maintain beam 31 in the first position, sealing first fluid port 34a, once beam 31 is sufficiently close to the first position. For example, a permanent magnet can be mounted with housing 30 so that the associated magnetic force on beam 31 is strong enough to overcome any passive urging of beam 31 away from the first position when beam 31 is in the first position. Once beam 31 is away from the first position, then the increased distance from the permanent magnet can result in the associated magnetic force being insufficient to overcome the passive urging away from the first position. Unless the valve is to be closed once for all time, active urging of beam 31, overcoming latching mechanism 35, is needed. Such active urging can be supplied, for example, by alternate energization of electromagnetic force generator 32. The operation of latching mechanism 35 allows the valve to remain in a closed state without additional energy input, an important consideration when available power is limited or when power is not continuously available. Diaphragm 33 and housing 30 can be shaped so that volume 35 is small; minimal valve dead volume can be important in some applications. Diaphragm 33 and housing 30 can further be shaped so that force on beam 31 is substantially balanced, minimizing the activation force required to open or close the valve.

VALVE EMBODIMENT

Figure 2:
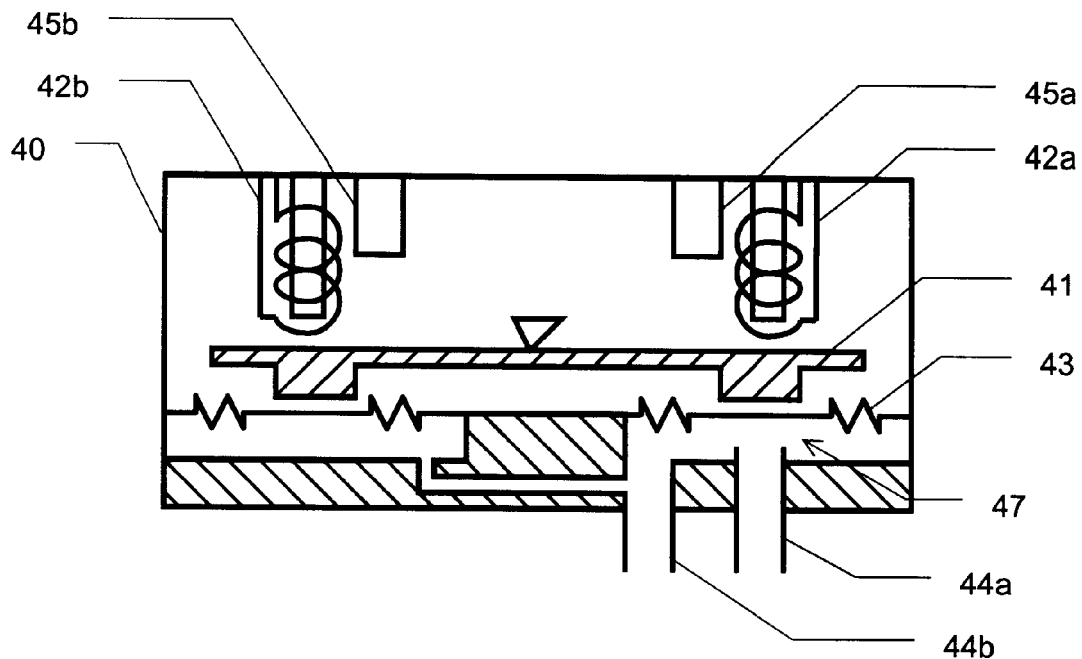
FIG. 2 is a schematic view of a miniature electromagnetic valve.

FIG. 2 is a schematic view of a valve according to the present invention. The valve shown in FIG. 2 is similar to that in the previous figure, with the addition of a second latching mechanism 45a and second electromagnetic force generator 42a mounted with housing 40. In operation, first electromagnetic force generator 42b urges beam 41 toward first fluid port 44a. Latch 45b exerts force on beam 41 sufficient to maintain beam 41 in the first position, sealing first fluid port 44a, once beam 41 is sufficiently close to the first position. For example, a permanent magnet 45b can be mounted with housing 40 so that the associated magnetic force on beam 41 is strong enough to overcome any passive urging of beam 41 away from the first position when beam 41 is in the first position. Once beam 41 is away from the first position, then the increased distance from permanent magnet 45b can result in the associated magnetic force being insufficient to overcome the passive urging away from the first position. Second electromagnetic force generator 42a can urge beam 41 away from the first position and to the second position. Latch 45a exerts force on beam 41 sufficient to maintain beam 41 in the second position, exposing and allowing fluid flow through first fluid port 44a, once beam 41 is sufficiently close to the second position. For example, a permanent magnet 45a can be mounted with housing 40 so that the associated magnetic force on beam 41 is strong enough to overcome any passive urging of beam 41 away from the second position when beam 41 is in the second position. Once beam 41 is away from the second position, then the increased distance from the permanent magnet can result in the associated magnetic force being insufficient to overcome the passive urging away from the first position. The operation of latching mechanisms 45a, 45b allows the valve to remain in either open or closed state without additional energy input, an important consideration when available power is limited or when power is not continuously available.

OTHER EMBODIMENTS

Those skilled in the art will appreciate other variations and combinations of the features shown herein. As an example, FIG. 3 is a schematic diagram of another miniature valve. Beam 51 mounts within housing 50, pivoting about or flexing in relation to fulcrum 56. Diaphragm 53 mounts with housing 50, forming a fluid volume 57 within housing 50. First 52a and second 52b actuator coils mount with housing 50. Beam 51 can exert force on diaphragm 53 either due to beam shape or to push rods 59. First 54a, second 54b, and third 54c fluid ports mount with housing 50. First fluid port 54a can serve as an inlet port, and second 54b and third 54c fluid ports can serve as outlet ports. Diaphragm 53 can comprise seats 53s aligned with and adapted to sealingly engage second 54b and third 54c fluid ports. Beam 51 can comprise a permanent magnet that can latch on the solenoid cores 55a, 55b in coils 52a, 52b.

In operation, first coil 52a and second coil 52b urge beam 51 in opposite directions. Latching mechanisms (such as magnetic attraction between beam 51 and core 55a) can hold beam 51 so that seat 53s seals either second 54b or third 54c fluid ports. The valve shown in FIG. 3 can be built in conjunction with a commercial latching relay. Diaphragm 53 isolates the relay components from the fluid volume, protecting the relay components from the fluid and providing a small dead volume in the valve. Shaping of the housing adjacent the diaphragm can further reduce the dead volume of the valve. Using a dual diaphragm as shown causes the pressure forces on the beam to be roughly balanced, so the relay must provide only a relatively small differential force. The shape of the housing adjacent the diaphragm can further control the portions of the valve exposed to fluid pressure, allowing precise balancing of the forces on the beam. For example, with fluid ports comprising 0.010" diameter conical needles, 100 psi differential pressure can be sealed with only 3.6 grams of force. Using a corrugated diaphragm can reduce the stiffness of the diaphragm, further reducing the force required from the relay. The diaphragm can be made of a material such as a polymer (e.g., parylene) to further reduce the stiffness. The seats can be made of a material such as nitrile rubber. Inert material can be used for the diaphragm and the portion of the housing exposed to fluid to prevent interaction between the valve and the fluid.

Figure 4:
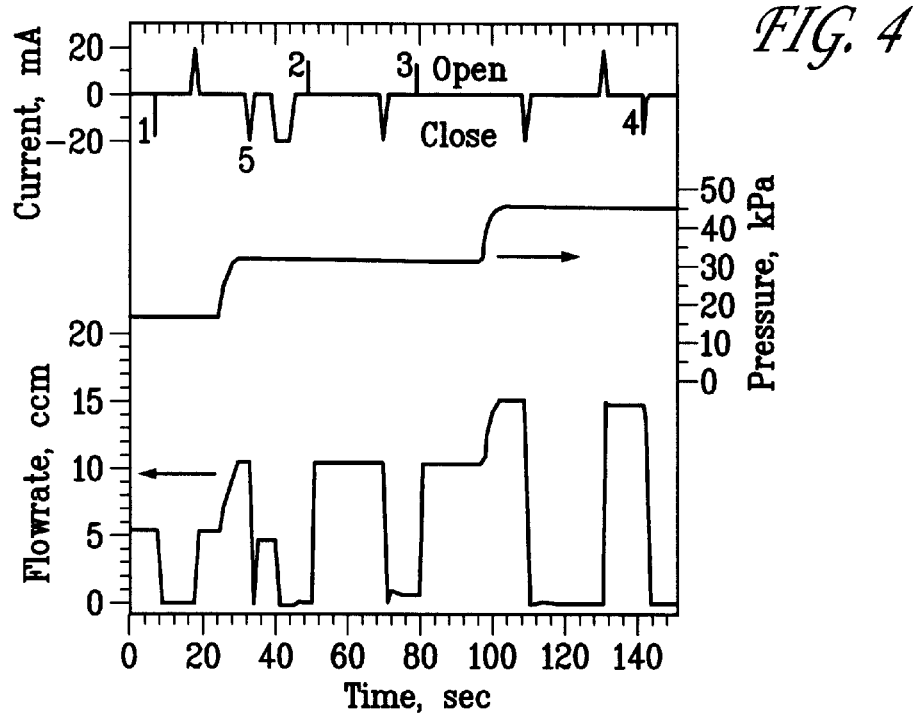
FIGS. 4 and 5 show operating characteristics of a miniature electromagnetic valve.
Figure 5:
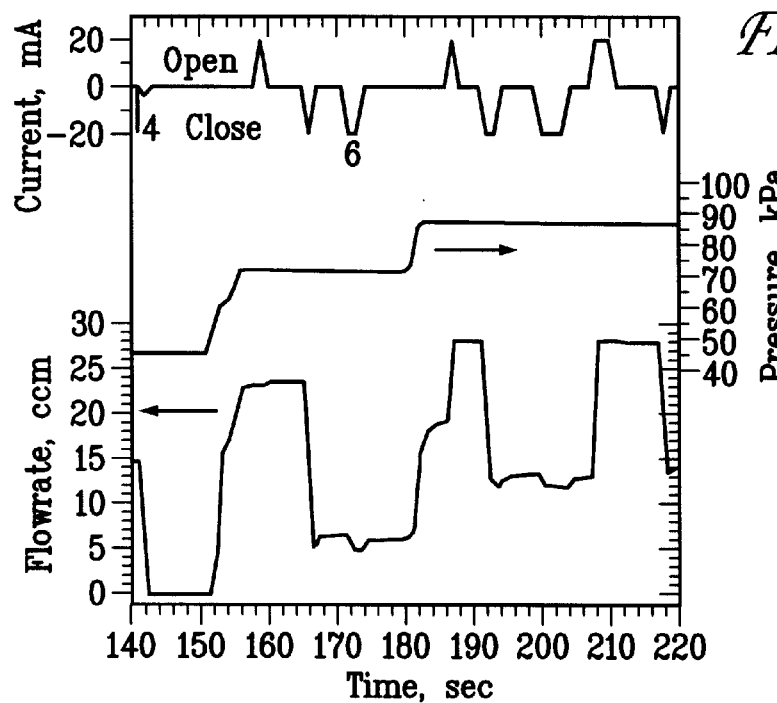

A valve according to FIG. 3 was built using a conventional two-coil relay, such as series number TQ2-L2 from NAIS. See NAIS TQ-Relays datasheet, incorporated herein by reference. A parylene bellows diaphragm, molded to less than 10 microns thickness, was used. FIGS. 4 and 5 show operating characteristics of the valve. The valve sealed against pressures up to 45 kPa (6.6 psi), and could be actuated with a 5V pulse of 1 second duration. Only 20 mA was required to toggle the valve, so 0.1 Joules of energy was consumed in each cycle. At pressures above 70 kPa (10 psi) the valve would no longer fully close, but would significantly reduce the flow.

OTHER DESIGN CONSIDERATIONS

A miniature valve can be made with a miniature short-throw solenoid with a spring or other mechanism to return the armature to an initial position. Cantilever and axial solenoids are both suitable. A latching capability can be added by mounting a permanent magnet so that it provides sufficient force on the armature to retain the armature in one of its stable positions.

Small scale solenoids generally exert relatively low force, and the force exerted reduces rapidly as the armature moves away from the coil. Accordingly, the position of the fluid port relative to the valve seat can be important. A fine thread screw adjustment or a sliding press fit can aid in precisely positioning the fluid port. A smooth surface on the outlet port can help achieve a good seal between the elastomeric seal and the fluid port.

A hypodermic needle having an adjustable position can be used as a fluid port. Screw adjustment of a hypodermic needle can aid in obtaining correct operation because of the very short throw of the electromechanical relay: the valve seat position can be adjusted by turning the screw until proper operation is achieved. Conical needles can be used as fluid ports to minimize the area to be sealed, minimizing the required actuation and holding force.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A miniature electrically operable valve, comprising:
a) a housing defining a volume;
b) a diaphragm mounted in said volume separating a fluid portion thereof from an actuation portion thereof;
c) first and second fluid ports in fluid communication with said fluid portion;
d) a beam mounted with said actuation portion of said housing so that said beam urges said diaphragm toward said first fluid port when said beam is in a first position, and so that said beam allows said diaphragm away from said first fluid port when said beam is in a second position;
e) an electromagnetic force generator mounted with said actuation portion of said housing that urges said beam toward a first urged position, wherein said first urged position is one of said first and second positions, when electrical energy is supplied to said electromagnetic force generator, wherein said electromagnetic force generator urges said beam toward said first position when electrical energy of a first polarity is supplied to said electromagnetic force generator and urges said beam toward said second position when electrical energy of a second polarity different from said first polarity is supplied to said electromagnetic force generator; and
f) a latch mounted with said housing, where said latch supplies force acting on said beam sufficient to hold said beam in a latched position, where said latched position is the position opposite said first urged position, when no electrical energy is supplied to said electromagnetic force generator, but insufficient to hold said beam in said latched position when electrical energy is supplied to said electromagnetic force generator.

2. The miniature electrically operable valve of claim 1 wherein said latch comprises a permanent magnet.

3. A miniature electrically operable valve, comprising:
a) a housing defining a volume;
b) a diaphragm mounted in said volume separating a fluid portion thereof from an actuation portion thereof;
c) first and second fluid ports in fluid communication with said fluid portion;
d) a beam mounted with said actuation portion of said housing so that said beam urges said diaphragm toward said first fluid port when said beam is in a first position, and so that said beam allows said diaphragm away from said first fluid port when said beam is in a second position;
e) an electromagnetic force generator mounted with said actuation portion of said housing that urges said beam toward a first urged position, wherein said first urged positions is one of said first and second positions, when electrical energy is supplied to said electromagnetic force generator;
f) a second electromagnetic force generator mounted with said housing that urges said beam toward a second urged position, where said second urged position is opposite said first urged position, when electrical energy is supplied to said second electromagnetic force generator.

4. The miniature electrically operable valve of claim 3, further comprising a latch mounted with said housing, where said latch supplies force acting on said beam sufficient to hold said beam in said first urged when no electrical energy is supplied to said second electromagnetic force generator, but insufficient to hold said beam in said first urged position when electrical energy is supplied to said second electromagnetic force generator.

5. The miniature electrically operable valve of claim 4, wherein said latch comprises a permanent magnet.

6. A valve according to claim 3, wherein said fluid portion is shaped so force from fluid pressure in said fluid portion urging said beam toward said first position is substantially equal to force from fluid pressure in said fluid portion urging said beam toward said second position.

7. A valve according to claim 3, further comprising a third fluid port in fluid communication with said fluid portion, wherein said beam urges said diaphragm toward said third fluid port when said beam is in said second position, and wherein said beam allows said diaphragm away from said third fluid port when said beam is in said first position.

8. A miniature electrically operable valve, comprising:
a) a housing defining a volume;
b) a diaphragm mounted in said volume separating a fluid portion thereof from an actuation portion thereof;
c) first and second fluid ports in fluid communication with said fluid portion;
d) a beam mounted with said actuation portion of said housing so that said beam urges said diaphragm toward said first fluid port when said beam is in a first position, and so that said beam allows said diaphragm away from said first fluid port when said beam is in a second position;
e) an electromagnetic force generator mounted with said actuation portion of said housing that urges said beam toward a first urged position, wherein said first urged position is one of said first and second positions, when electrical energy is supplied to said electromagnetic force generator, wherein said electromagnetic force generator urges said beam toward said first position when electrical energy of a first polarity is supplied to said electromagnetic force generator and urges said beam toward said second position when electrical energy of a second polarity different from said first polarity is supplied to said electromagnetic force generator;
wherein said fluid portion is shaped so force from fluid pressure in said fluid portion urging said beam toward said first position is substantially equal to force from fluid pressure in said fluid portion urging said beam toward said second position.

9. A miniature electrically operable valve comprising:
a) a container;
b) a diaphragm mounted with container forming a sealed fluid volume therein;
c) a short-throw solenoid mounted within the container, comprising an armature that moves between two positions responsive to electromagnetic urging, wherein movement of said armature urges movement of said diaphragm;
d) a return mechanism adapted to urge the armature to a rest position;
e) a first fluid port in fluid communication with the sealed fluid volume and mounted with the container positioned so that the diaphragm sealingly engages the first fluid port when the armature is in one of its two positions;
f) a second fluid port in fluid communication with the sealed fluid volume; and
g) a third fluid port in fluid communication with the sealed fluid volume and mounted with the container positioned so that the diaphragm sealingly engages the third fluid port when the armature is in one of its two positions.

10. A valve according to claim 9, wherein said diaphragm comprises a seat that sealingly engages said first fluid port when said beam is in said first position.

11. A valve according to claim 9, wherein said diaphragm comprises a corrugated bellows diaphragm.

12. A valve according to claim 9, wherein said diaphragm comprises a polymer.

* * * * *